(12) United States Patent
Ahn et al.

(10) Patent No.: US 11,272,549 B2
(45) Date of Patent: *Mar. 8, 2022

(54) WIRELESS COMMUNICATION METHOD FOR SIMULTANEOUS DATA TRANSMISSION, AND WIRELESS COMMUNICATION TERMINAL USING SAME

(71) Applicants: WILUS INSTITUTE OF STANDARDS AND TECHNOLOGY INC., Seoul (KR); SK TELECOM CO., LTD., Seoul (KR)

(72) Inventors: Woojin Ahn, Seoul (KR); Yongho Kim, Incheon (KR); Juhyung Son, Gyeonggi-do (KR); Jinsam Kwak, Gyeonggi-do (KR)

(73) Assignees: WILUS INSTITUTE OF STANDARDS AND TECHNOLOGY INC., Seoul (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,104

(22) Filed: Sep. 8, 2020

(65) Prior Publication Data

US 2020/0404716 A1 Dec. 24, 2020

Related U.S. Application Data

(63) Continuation of application No. 16/371,898, filed on Apr. 1, 2019, now Pat. No. 10,813,139, which is a
(Continued)

(30) Foreign Application Priority Data

| Jun. 27, 2014 | (KR) | 10-2014-0080251 |
| Jul. 8, 2014 | (KR) | 10-2014-0085344 |
| Mar. 13, 2015 | (KR) | 10-2015-0035000 |

(51) Int. Cl.
  *H04W 74/08* (2009.01)
  *H04L 1/16* (2006.01)
  (Continued)

(52) U.S. Cl.
  CPC ........... *H04W 74/0833* (2013.01); *H04L 1/16* (2013.01); *H04W 72/0413* (2013.01);
  (Continued)

(58) Field of Classification Search
  CPC ........ H04L 1/12; H04L 1/16; H04W 72/0413; H04W 72/042; H04W 74/006;
  (Continued)

(56) References Cited

U.S. PATENT DOCUMENTS

2008/0008186 A1  1/2008  Fan et al.
2009/0252143 A1  10/2009 Sridhara et al.
(Continued)

FOREIGN PATENT DOCUMENTS

CN  102007723  4/2011
CN  102860069  1/2013
(Continued)

OTHER PUBLICATIONS

International Search Report for PCT/KR2015/006658 dated Oct. 19, 2015 and its English translation from WIPO.
(Continued)

*Primary Examiner* — Chi H Pham
*Assistant Examiner* — Vladislav Y Agureyev
(74) *Attorney, Agent, or Firm* — Ked & Associates, LLP

(57) ABSTRACT

The present invention relates to a wireless communication method for simultaneous data transmission and a wireless communication terminal using the same, and more particularly, a wireless communication method in which a plurality of terminals simultaneously transmit data for improving a data throughput in a high density environment, and a wire-
(Continued)

less communication terminal using the same. To this end, the present invention provides a wireless communication method for a terminal including transmitting a trigger frame indicating simultaneous uplink data transmission of multi-users, receiving uplink data transmitted by a plurality of terminals in response to the trigger frame, and transmitting a block acknowledgement for the plurality of terminals having transmitted the uplink data, and a wireless communication terminal using the same.

14 Claims, 18 Drawing Sheets

Related U.S. Application Data continuation of application No. 15/320,751, filed as application No. PCT/KR2015/006658 on Jun. 29, 2015, now Pat. No. 10,278,210.

(51) Int. Cl.
*H04W 74/00* (2009.01)
*H04W 72/04* (2009.01)
*H04W 84/12* (2009.01)
*H04W 74/04* (2009.01)

(52) U.S. Cl.
CPC .......... *H04W 74/006* (2013.01); *H04W 74/04* (2013.01); *H04W 84/12* (2013.01)

(58) Field of Classification Search
CPC . H04W 74/04; H04W 74/0413; H04W 74/06; H04W 74/08–0891; H04W 84/12
See application file for complete search history.

(56) References Cited

U.S. PATENT DOCUMENTS

| | | |
|---|---|---|
| 2011/0286377 A1 | 11/2011 | Sampath |
| 2012/0314697 A1 | 12/2012 | Noh et al. |
| 2013/0235773 A1 | 9/2013 | Wang |
| 2014/0016607 A1 | 1/2014 | Hart |
| 2014/0204818 A1 | 7/2014 | Trainin |
| 2014/0307653 A1 | 10/2014 | Liu |
| 2015/0063111 A1 | 3/2015 | Merlin |
| 2015/0063233 A1* | 3/2015 | Choi ................. H04W 72/0446 370/329 |
| 2015/0146654 A1 | 5/2015 | Chu |
| 2015/0365940 A1 | 12/2015 | Chu |
| 2015/0382283 A1 | 12/2015 | Wang |
| 2016/0014804 A1* | 1/2016 | Merlin ................ H04W 28/065 370/329 |
| 2016/0029373 A1* | 1/2016 | Seok ..................... H04L 1/1848 370/338 |
| 2016/0095139 A1 | 3/2016 | Ding |
| 2016/0113034 A1* | 4/2016 | Seok ..................... H04W 74/04 370/329 |
| 2016/0127233 A1 | 5/2016 | Wentink |
| 2016/0128024 A1 | 5/2016 | Frederiks |
| 2016/0157266 A1 | 6/2016 | Wang |
| 2016/0165588 A1 | 6/2016 | Ghosh |
| 2016/0198500 A1* | 7/2016 | Merlin .................. H04W 74/08 370/329 |
| 2016/0227533 A1 | 8/2016 | Josiam |
| 2016/0234834 A1 | 8/2016 | Aboul-Magd |
| 2016/0262185 A1* | 9/2016 | Ghosh ............... H04W 74/0833 |
| 2016/0316458 A1 | 10/2016 | Kwon |
| 2016/0338085 A1 | 11/2016 | Wu |
| 2016/0345349 A1 | 11/2016 | Ferdowski |
| 2017/0126293 A1* | 5/2017 | Chen ..................... H04L 69/323 |
| 2017/0171723 A1 | 6/2017 | Adachi |
| 2017/0171878 A1* | 6/2017 | Chun .................. H04B 7/0404 |
| 2017/0325266 A1 | 11/2017 | Kim |

FOREIGN PATENT DOCUMENTS

| | | |
|---|---|---|
| CN | 103503553 | 1/2014 |
| WO | WO 2011/065749 | 6/2011 |

OTHER PUBLICATIONS

Written Opinion of the International Searching Authority for PCT/KR2015/006658 dated Oct. 19, 2015 and its English machine translation by Google Translate.
U.S. Office Action dated Aug. 8, 2018 issued in U.S. Appl. No. 15/320,751.
Chinese Office Action dated Mar. 29, 2019 issued in Application No. 201580034543.8.
U.S. Notice of Allowance dated Jun. 5, 2020 issued in U.S. Appl. No. 16/371,898.

* cited by examiner

| Octets: | 1 | 1 | 1 | 1 | 1~251 |
|---|---|---|---|---|---|
| | Element ID | Length | Slot Count | Bitmap Control | Partial Virtual Bitmap |

*FIG. 17*

WIRELESS COMMUNICATION METHOD FOR SIMULTANEOUS DATA TRANSMISSION, AND WIRELESS COMMUNICATION TERMINAL USING SAME

CROSS-REFERENCE TO RELATED PATENT APPLICATIONS

This application is a continuation of U.S. patent application Ser. No. 16/371,898, filed Apr. 1, 2019, which is a continuation of U.S. patent application Ser. No. 15/320,751, filed Dec. 21, 2016 (now U.S. Pat. No. 10,278,210), which is a U.S. National Stage Application under 35 U.S.C. § 371 of PCT Application No. PCT/KR2015/006658, filed Jun. 29, 2015, which claims priority to Korean Patent Application No's. 10-2014-0080251, filed Jun. 27, 2014, 10-2014-0085344, filed Jul. 8, 2014 and 10-2015-0035000, filed Mar. 13, 2015, whose entire disclosures are hereby incorporated by reference.

TECHNICAL FIELD

The present invention relates to a wireless communication method for simultaneous data transmission and a wireless communication terminal using the same, and more particularly, to a wireless communication method in which a plurality of terminals simultaneously transmit data for improving a data throughput in a high density environment and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention provides wireless LAN communication with high-efficiency/high-performance in a high-density environment.

The present invention also provides a method in which a plurality of terminals efficiently perform simultaneous data transmission.

The present invention also enables a plurality of terminals to perform distributed data transmission using multiple channels.

Technical Solution

In order to solve the above-described technical problems, the present invention provides the following wireless communication method and wireless communication terminal.

The present invention provides a wireless communication method for a terminal including: transmitting a trigger frame indicating simultaneous uplink data transmission of multi-users; receiving uplink data transmitted by a plurality of terminals in response to the trigger frame; and transmitting a block acknowledgement for the plurality of terminals having transmitted the uplink data.

In addition, the present invention provides a wireless communication terminal including: a transceiver for transmitting/receiving a wireless signal; and a processor for controlling an operation of the terminal, wherein the processor transmits a trigger frame for indicating simultaneous uplink data transmission of multi-users, receives uplink data transmitted by a plurality of terminals in response to the trigger frame, and transmits a block acknowledgement for the plurality of terminals having transmitted the uplink data.

At this point, the uplink data may be received through channels respectively allocated to the plurality of terminals by orthogonal frequency-division multiple access.

In addition, the trigger frame may indicate an uplink data transmission time of the plurality of terminals.

According to an embodiment, the trigger frame may indicate at least one of a designated access period and a random access period of the plurality of terminals.

At this point, in the designated access period, the uplink data of at least one terminal designated by the trigger frame may be received through a designated channel, and in the random access period, uplink data of at least one terminal having the uplink data to be transmitted may be received through a channel allocated to the random access period.

In addition, the designated access period and the random access period may be classified and allocated to different channel groups.

In addition, the designated access period and the random access period may be classified and allocated to different transmission times.

According to an embodiment of the present invention, the block acknowledgement may have a frame format of a Multi-TID block acknowledgement and include an identifier representing that the corresponding frame is a block acknowledgement for the plurality of terminals.

In addition, the block acknowledgement may include identifier information or partial identifier information for the plurality of terminals that are reception targets of the corresponding frame.

Next, the present invention provides a wireless communication method for a terminal including: receiving, from an AP, a trigger frame indicating simultaneous uplink data transmission of multi-users; transmitting uplink data to the AP in response to the trigger frame; receiving, from the AP, a block acknowledgement for the plurality of terminals in response to the uplink data transmission, wherein the uplink data transmission is simultaneously performed by the plurality of terminals through a channel allocated by orthogonal frequency-division multiple access.

In addition, the present invention provides a wireless communication terminal including: a transceiver for transmitting/receiving a wireless signal; and a processor for controlling an operation of the terminal, wherein the processor receives, from an AP, a trigger frame for indicating simultaneous uplink data transmission of multi-users, transmits uplink data to the AP in response to the trigger frame, and receives, from the AP, a block acknowledgement for a plurality of terminals in response to the uplink data transmission.

At this point, the uplink data transmission of the plurality of terminals may be performed at a predetermined time in response to the reception of the trigger frame.

In addition, each of the plurality of terminals may be allocated with at least one of a plurality of slots divided into at least one of a transmission time and a transmission channel, and transmit the uplink data using the at least one allocated slot.

In addition, the trigger frame may indicate at least one of a designated access period and a random access period of the plurality of terminals.

At this point, in the designated access period, at least one terminal designated by the trigger frame may transmit uplink data through a designated channel, and in the random access period, at least one terminal having uplink data to be transmitted may transmit uplink data through a channel allocated to the random access period.

Advantageous Effects

According to an embodiment of the present invention, an environment in which a plurality of terminals can simultaneously transmit data may be provided to increase the overall resource utilization ratio and improve the performance of a wireless LAN system.

In addition, according to an embodiment of the present invention, in the uplink transmission of multi-users in a contention-based channel access system, a block acknowledgement for a plurality of terminals may be used to perform efficient response transmission.

In addition, according to an embodiment of the present invention, by implementing a trigger frame and a block acknowledgement frame for simultaneous transmission of uplink data using frames used by existing legacy terminals, compatibility with the legacy terminals may be maintained and system changes may be minimized.

In addition, according to an embodiment of the present invention, the spectrum efficiency of an entire network may be increased in an overcrowded OBSS environment.

DESCRIPTION OF DRAWINGS

FIG. 17 illustrates an embodiment of a trigger frame with which simultaneous data transmissions of multi-users are triggered.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2014-0080251, 10-2014-0085344 and 10-2015-0035000 filed in the Korean Intellectual Property Office and the embodiments and mentioned items described in the respective applications are included in the Detailed Description of the present application.

Figure 1:
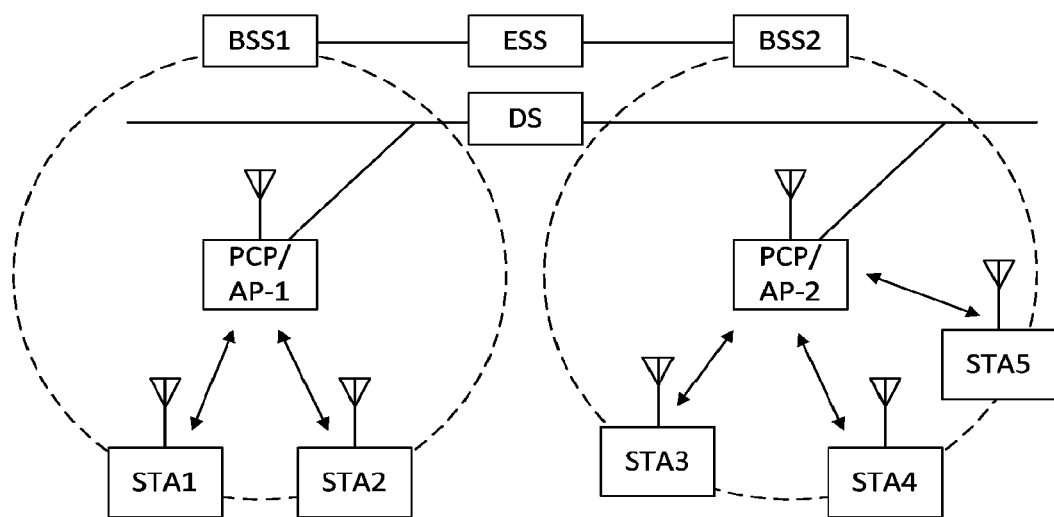
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
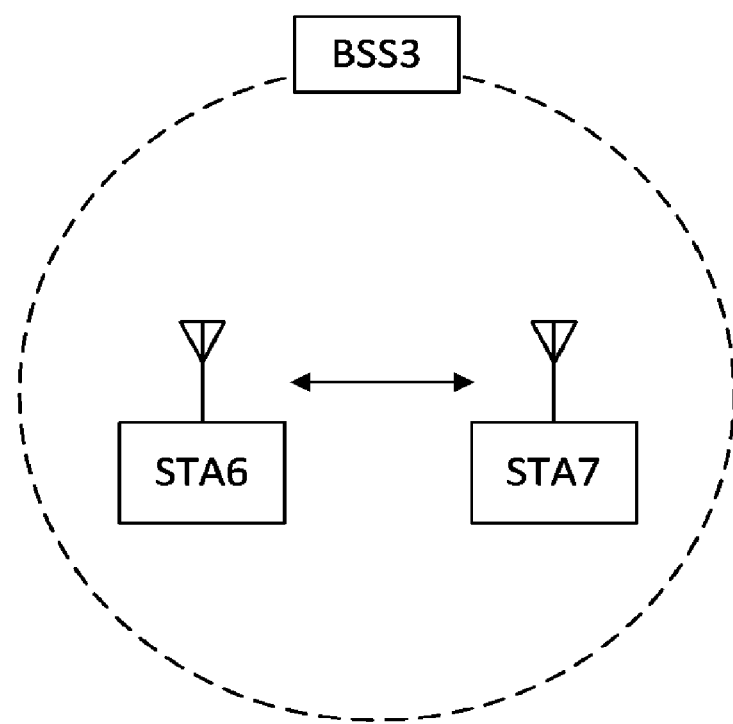
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
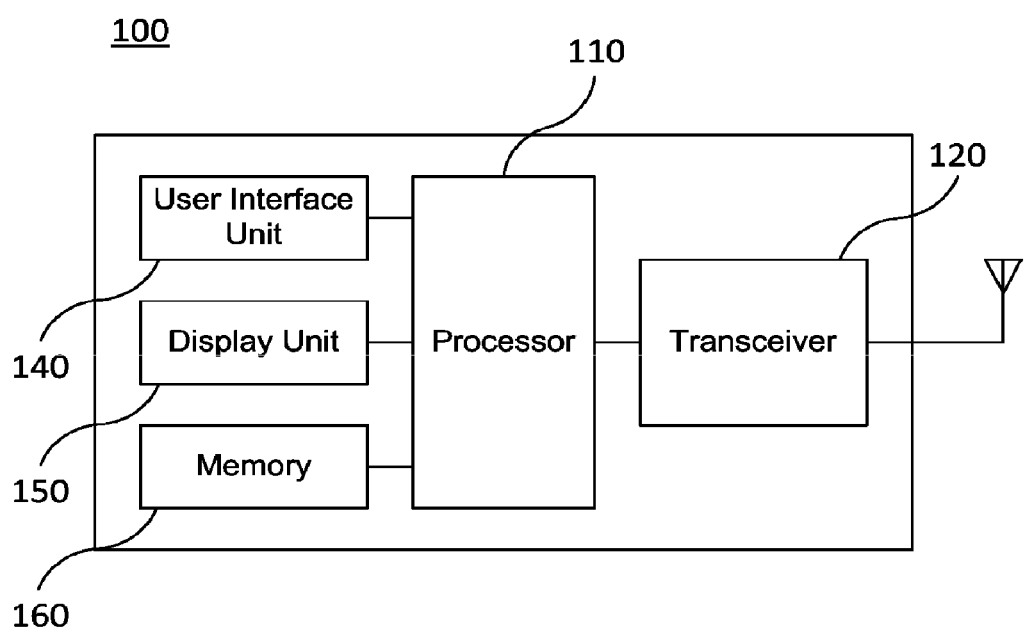
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the info nation on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
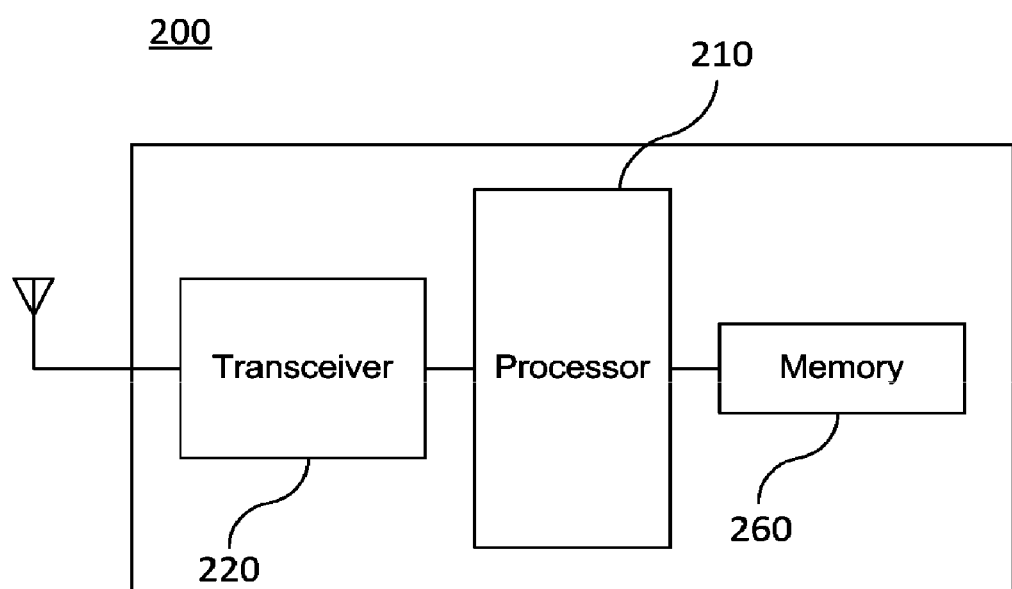
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
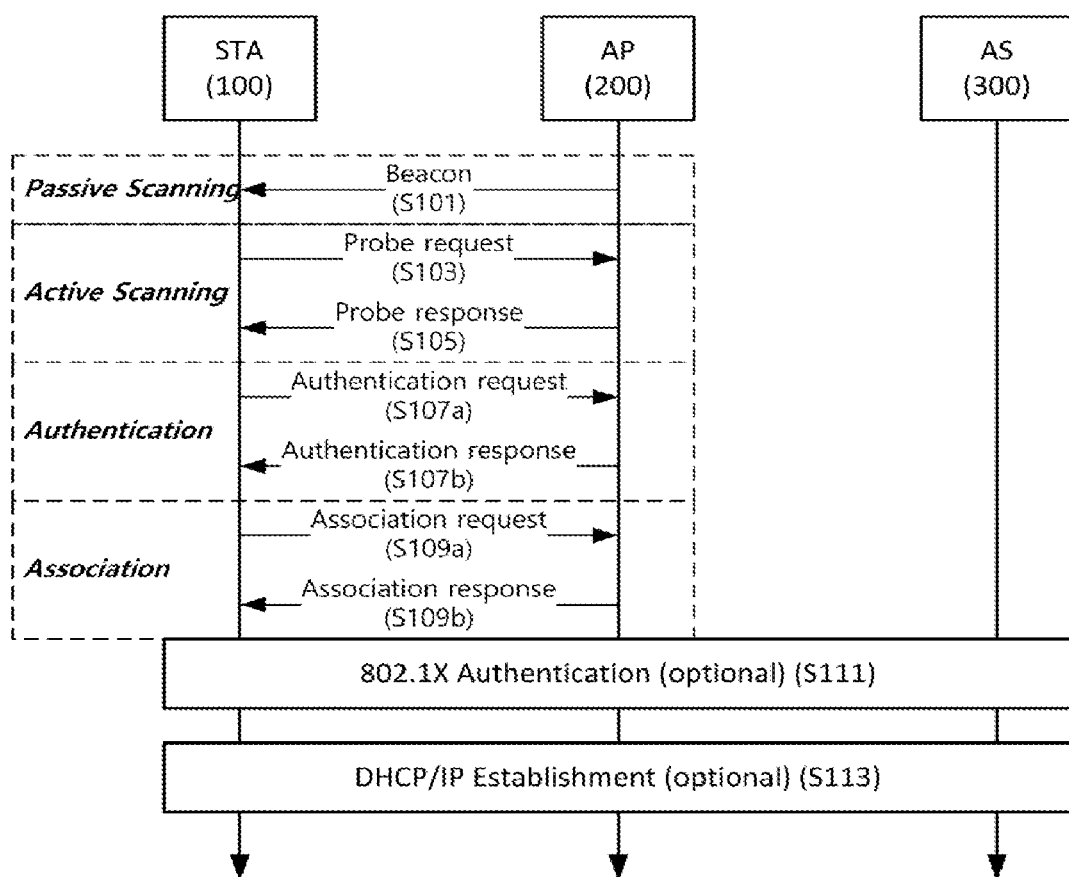
FIG. 5 schematically illustrates a process in which a STA establishes a link with an AP.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
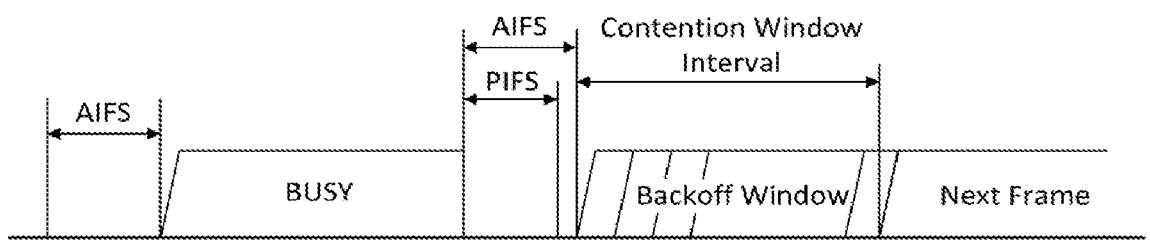
FIG. 6 illustrates a Carrier Sense Multiple Access (CSMA)/Collision Avoidance (CA) method used in a wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a radio signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a radio signal having the CCA threshold or more, which is received by the terminal, indicates the corresponding terminal as a receiver, the terminal processes the received radio signal. Meanwhile, when a radio signal is not sensed in the corresponding channel or a radio signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number allocated to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are allocated with new random numbers, respectively to perform the backoff procedure again. According to an embodiment, a random number newly allocated to each terminal may be decided within a range (2*CW) which is twice larger than a range (a contention window, CW) of a random number which the corresponding terminal is previously allocated with. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
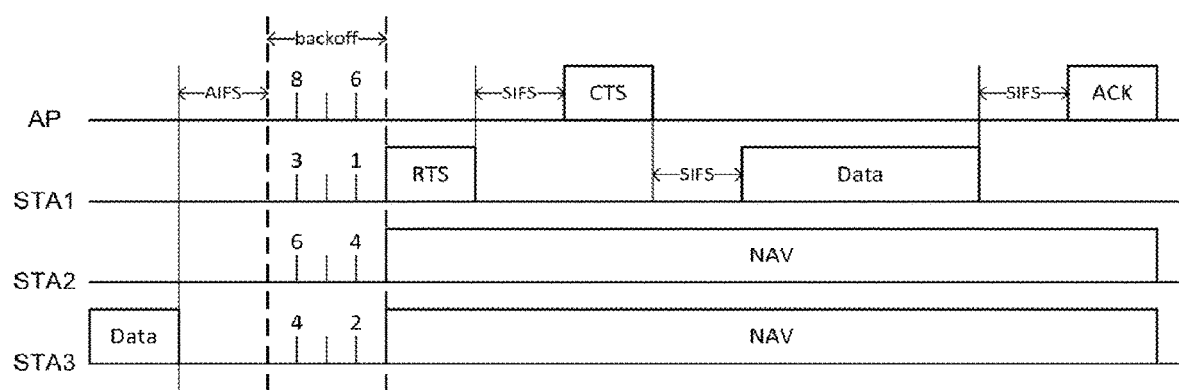
FIG. 7 illustrates a method for performing a Distributed Coordination Function (DCF) using a Request to Send (RTS) frame and a Clear to Send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number allocated to each terminal after an AFIS time. A transmitting terminal in which the backoff counter is expired transmits the request to send (RTS) frame to notify that corresponding terminal has data to transmit. According to an exemplary embodiment of FIG. 7, STA1 which holds a lead in contention with minimum backoff may transmit the RTS frame after the backoff counter is expired. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target lei final (i.e., a terminal of the receiver address) due to a situation such as interference or a collision, a subsequent process is suspended. The transmitting terminal STA1 that transmitted the RTS frame regards that the data transmission is unavailable and participates in a next contention by being allocated with a new random number. In this case, the newly allocated random number may be determined within a range (2*CW) twice larger than a previous predetermined random number range (a contention window, CW).

In the exemplary embodiments given below, a case where a first terminal transmits an RTS frame to a second terminal may be construed as a meaning that the first terminal transmits the RTS frame in which a transmitter address is an address of the first terminal and a receiver address is an address of the second terminal unless otherwise stated. Further, a case where the first terminal transmits a CTS frame to the second terminal may be construed as a meaning that the first terminal transmits the CTS frame in which a receiver address is an address of the second terminal unless otherwise stated.

On the other hand, the aforementioned contention-based data transmission methods can operate well in an environment with less users, but the communication performance is drastically deteriorated in an environment where there are many users to transmit packets. Therefore, a method in which a plurality of terminals efficiently transmit and receive data in a dense user environment is required. Hereinafter, methods for transmitting and receiving data according to embodiments of the present invention will be described with reference to each drawing. In the embodiments of the drawings, duplicative description of parts which are the same as or correspond to the embodiments of the previous drawings will be omitted.

Figure 8:
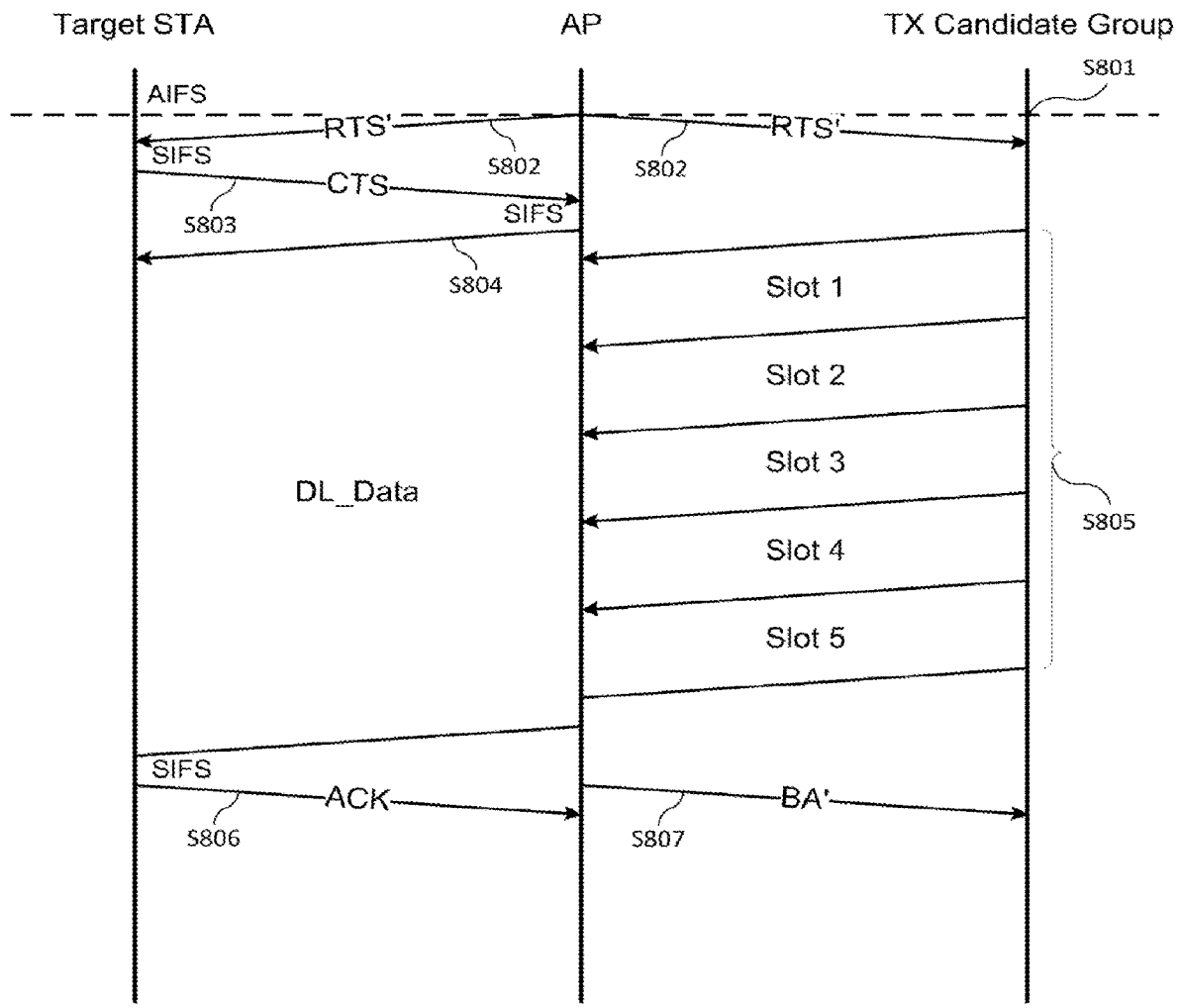
FIGS. 8 and 9 illustrate embodiments in which a plurality of terminals perform simultaneous data transmission.
Figure 9:
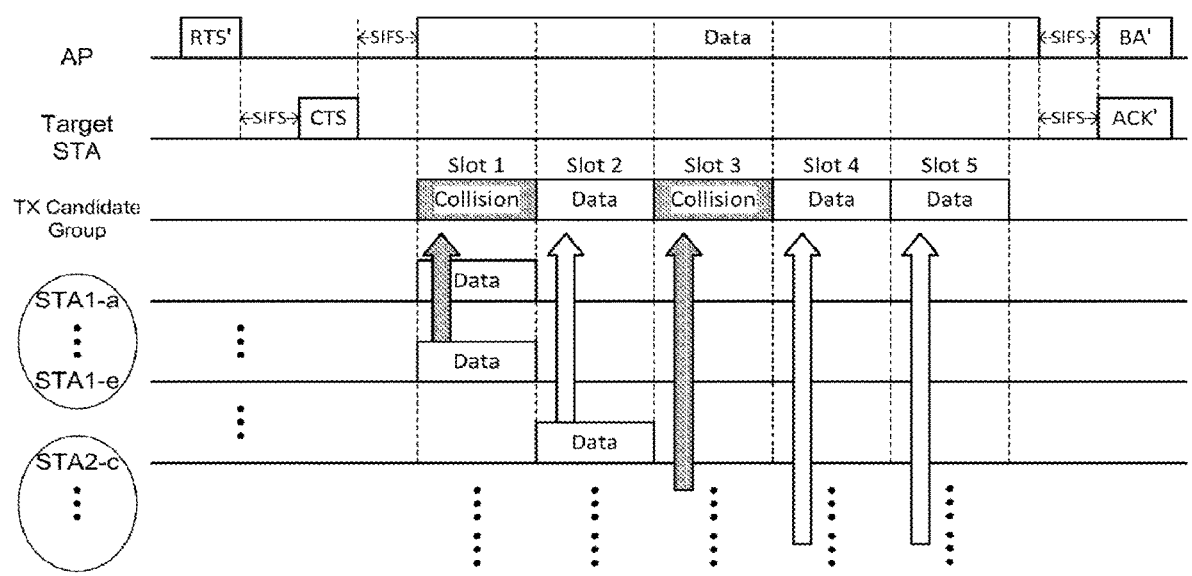

FIGS. 8 and 9 illustrate embodiments in which a plurality of terminals perform simultaneous data transmission. According to the embodiments of the FIGS. 8 and 9, a plurality of terminals may perform simultaneous data transmission for efficient data transmission in a dense user environment. At this point, the plurality of terminals in a BSS are grouped into at least one group and data transmissions of terminals are performed in units of an allocated group.

First, referring to FIG. 8, an AP transmits a trigger frame indicating simultaneous transmission of uplink data (UL_Data) by multi-users (S802). According to the embodiment of the present invention, a resource for uplink data transmission to the AP is divided into a plurality of slots and simultaneous uplink data transmission may be performed for each divided slot. Here, the resource includes at least one of a transmission time and a transmission channel. The number of slots for data transmission may be determined according to various embodiments. For example, a predetermined number of slots may be used or the AP may determine the number of slots and deliver the corresponding slot number information to each terminal. In addition, according to an embodiment of the present invention to be described later, when the AP performs simultaneous data transmission and reception, the number of slots may be determined based on a duration of down link data (DL_Data) of the AP or based on a ratio between the duration of the downlink data (DL_Data) and a duration of uplink data (UL_Data) of the terminals. In the embodiment of the present invention, the duration of data represents the time necessary for transmitting the corresponding data. The duration of data may also be referred to as a length of data, a length of data frame, or a length of data packet, etc., according to an embodiment.

According to the embodiment of the present invention of FIG. 8, a modified RTS (hereinafter, RTS') frame may be used as the trigger frame. According to an embodiment of the present invention, the RTS' frame may have a format of a basic RTS frame and indicate uplink data transmission of multi-users through predetermined bits of a preamble. At this point, information for indicating the uplink data transmission of the multi-users may be included in a non-legacy preamble decodable by a non-legacy terminal (e.g. 802.11ax terminal) and may be expressed through reserved bits in a VHT-SIG-A field. In addition, the RTS' may also indicate the uplink data transmission of the multi-users through a reserved bit of a MAC header. Moreover, the RTS' may further include additional information such as the number of slots used in the uplink data transmission of the multi-users.

The AP may perform a separate backoff procedure for transmitting the RTS'. When a backoff counter expires (S801), the AP transmits the RTS' as a trigger frame. A plurality of terminals receiving the RTS' frame may transmit uplink data corresponding thereto and a time point of the uplink data transmission of each terminal may be determined based on the RTS' frame. On the other hand, according to an additional embodiment of the present invention, the RTS' may indicate that downlink data transmission of the AP may be performed together with the uplink data transmission of the plurality of terminals. In other words, the AP may transmit downlink data to a target STA while simultaneously receiving uplink data from the plurality of terminals. Further, the AP may trigger such simultaneous transmission and reception of data by transmitting the RTS'. At this point, the target STA having received the RTS' transmits a CTS after a SIFS time (S803).

When the simultaneous data transmission is triggered by the RTS', the plurality of terminals transmit uplink data to the AP in response to the RTS' (S805). The uplink data transmissions by the plurality of terminals are performed in a plurality of allocated slots Slot 1 to Slot 5 and are started at a transmission time point designated by the RTS'. At this point, terminals in the BSS having uplink data to be transmitted, namely, terminals of a transmission candidate group (TX Candidate Group) attempt to transmit the uplink data through slots allocated to corresponding terminals. In an embodiment of the present invention, the plurality of slots Slot 1 to Slot 5 may be divided by a time unit or a channel unit. In addition, the plurality of slots Slot 1 to Slot 5 may be divided by a subchannel unit. In other words, in the embodiment of the present invention, a slot may indicate at least one of a specific time slot and a specific channel (or a subchannel). When the plurality of slots are divided by the time unit, the plurality of terminals may sequentially transmit uplink data using a slot allocated to each terminal. In addition, when the plurality of slots are divided by the channel or subchannel unit, the plurality of terminals may transmit the uplink data through a channel or subchannel allocated to each terminal by using Orthogonal Frequency Domain Multiple Access (OFDMA). The AP receives the uplink data transmitted by the plurality of terminals.

According to an embodiment, each terminal may determine a slot to be used by the corresponding terminal and may transmit the uplink data through the determined slot. At this point, a slot number to be used by the terminal may be determined based on information included in the trigger frame, namely, the RTS'. For example, the terminal may obtain the information on the number of slots used for the uplink data transmission and determine the slot number based on a result value of modulo-calculating an identifier of the corresponding terminal with the number of slots. Alternatively, the terminal may obtain the slot number based on hashing operation using the identifier of the corresponding terminal and the number of slots. At this point, as the identifier of the terminal, a MAC address or an association identification (AID) of the corresponding terminal, etc., may be used. According to another embodiment, a slot through which each terminal transmits the uplink data may be allocated by the AP and the terminal may also receive the allocated slot information from the AP. The slot allocation process may be individually performed for each terminal in the BSS, and thus a plurality of terminals may be allocated to one slot.

On the other hand, according to an additional embodiment of the present invention, whether to transmit the uplink data by each terminal may be determined based on reception power of the CTS transmitted corresponding to the RTS'. When the reception power of the CTS is equal to or greater than a predetermined threshold value, the terminal may be considered to be in an interference relationship with the target STA, which has transmitted the CTS, and may not participate in the uplink data transmission. At this point, the corresponding terminal sets a network allocation vector (NAV) based on a duration field value of the CTS and/or RTS' and does not perform data transmission until the set NAV is expired. However, when the reception power of the CTS is smaller than the predetermined threshold value or the CTS is not received, the terminal attempts to transmit the uplink data in a slot allocated to the corresponding terminal.

When the uplink data reception from the plurality of terminals is completed, the AP transmits an acknowledgement (ACK) in response to each uplink data. According to an embodiment of the present invention, the AP may transmit a block acknowledgement for the plurality of terminals (Multi-STA Block ACK, BA') in response to the uplink data reception from the plurality of terminals (S807). In other words, the AP may transmit the ACK(s) for the plurality of terminals by using one BA'. According to an embodiment of the present invention, the BA' may have a frame format of a basic block ACK (BA) or a Multi-traffic ID (TID) BA. Furthermore, the BA' may include identifier information on the plurality of terminals to indicate the ACK for the uplink data transmitted by each terminal. A detailed description thereof will be described later. On the other hand, according to the above-described embodiment, when simultaneous data transmission and reception of the AP is triggered by the RTS', the target STA having received downlink data from the AP also transmits an ACK (S806). According to an embodiment, the ACK transmission of the target STA and BA' transmission of the AP may be performed at the same time.

FIG. 9 illustrates a more detailed embodiment in which the uplink data of the plurality of terminals is transmitted. In the embodiment of FIG. 9, duplicative descriptions of parts which are the same as or corresponding to the embodiment of FIG. 8 will be omitted.

When a simultaneous uplink data transmission is triggered by the RTS', each terminal in the BSS transmits uplink data through an allocated slot. As described above, the slot may represent a specific channel (or a subchannel) or a specific transmission time. In the embodiment of FIG. 9, an interval for the uplink data transmission is composed of total 5 slots Slot 1 to Slot 5, and each terminal in the BSS is allocated with at least one of the 5 slots. Terminals of a TX Candidate Group having uplink data to be transmitted perform the uplink data transmission through the slot allocated to the corresponding terminal. According to an embodiment of the present invention, a plurality of terminals may be allocated to each slot. Accordingly, when the plurality of terminals simultaneously perform the uplink data transmission in the same slot, a collision may occur.

Referring to FIG. 9, in Slot 1, STA1-a and STA1-e simultaneously transmit uplink data and thereby a collision occurs. However, in Slot 2, only STA2-c transmits uplink data and the AP may normally receive the corresponding data. Similarly, in Slot 3, two or more terminals simultaneously perform uplink data transmission and thereby a collision occurs. In Slots 4 and 5, one terminal transmits uplink data and the AP normally receives the corresponding data, respectively. In response to reception of the uplink data from a plurality of terminals, the AP transmits a block acknowledgement (BA') for the plurality of terminals according to the above-described embodiment. At this point, the block acknowledgement (BA') may include acknowledgement information for the normally received uplink data in Slots 2, 4 and 5.

Figure 10:
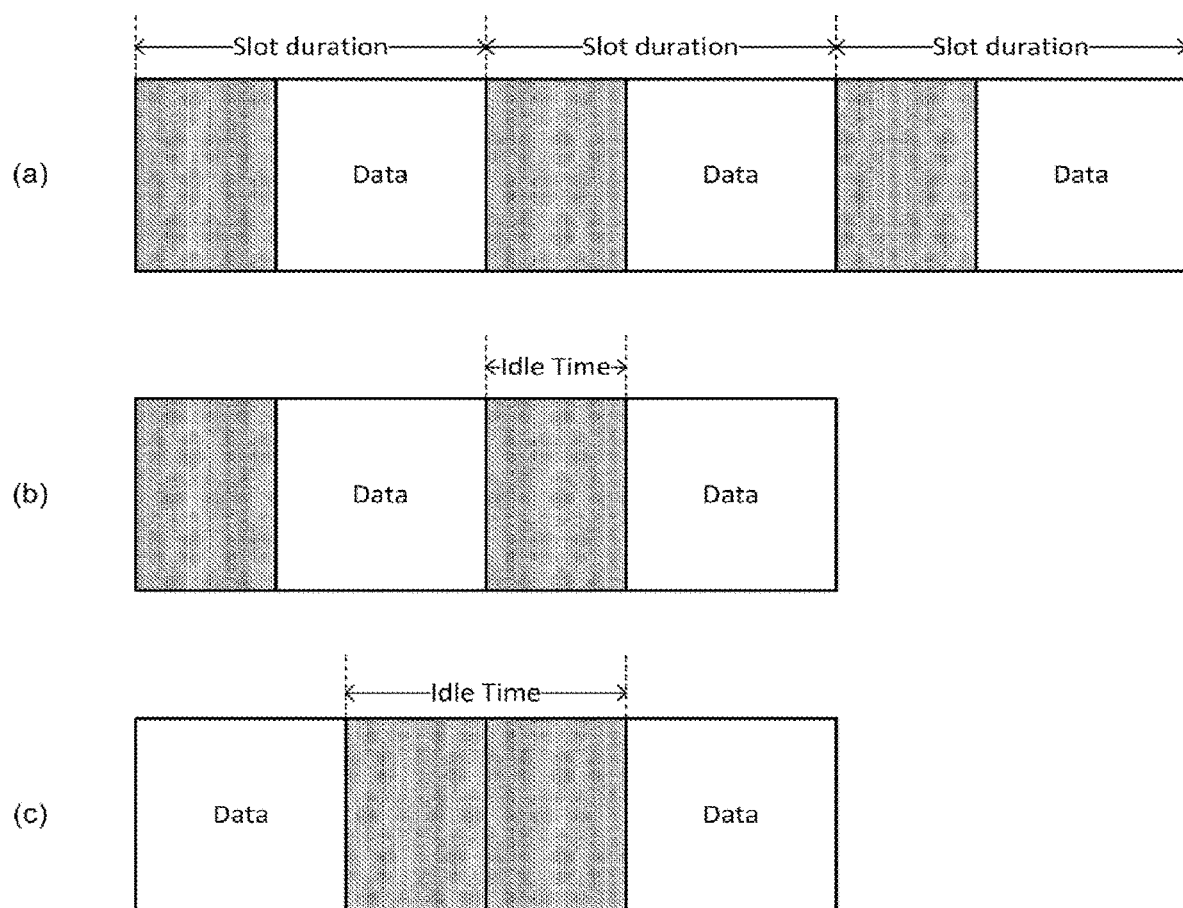
FIG. 10 illustrates a slot structure according to an embodiment of the present invention.

FIG. 10 illustrates a slot structure according to an embodiment of the present invention. When a plurality of wireless terminals attempt to access through consecutive slots, data in adjacent slots may overlap due to a transmission delay, or the like. According to an embodiment of the present invention, in order to prevent such data overlap, a guard interval may be set between each slot as shadowed in FIGS. 10(a) to 10(c). Accordingly, a slot duration including the guard interval may be determined to be longer than a duration of uplink data of a terminal.

The length of the guard interval may be determined based on a maximum transmission delay value of the terminal. In other words, as illustrated in FIG. 10(b), the minimum length of the guard interval may be set to be a maximum transmission delay value allowed by a corresponding BSS. The maximum transmission delay value represents a prediction value of delay time taken when a terminal located farthest in a service area of the AP transmits data. On the other hand, referring to FIG. 10(c), the maximum length of the guard interval may be set to be equal to or shorter than an AIFS or DIFS time, which is a waiting time when terminals in the BSS attempt data transmission. Accordingly, it is possible to prevent a legacy terminal or the like from transmitting data during the guard interval in an idle state.

On the other hand, although the guard interval is illustrated as being configured with a predetermined time in FIG. 10, the present invention is not limited thereto. In other words, when slots are divided by a channel unit or a subchannel unit according to an embodiment of the present invention, the guard interval may be configured with a predetermined number of subcarriers.

FIGS. 11 to 14 illustrate various embodiments of a block acknowledgement for a plurality of terminals according to the present invention. In respective embodiments of FIGS. 11 to 14, duplicative descriptions of parts which are the same as or corresponding to the embodiments of previous drawings will be omitted.

Figure 11:
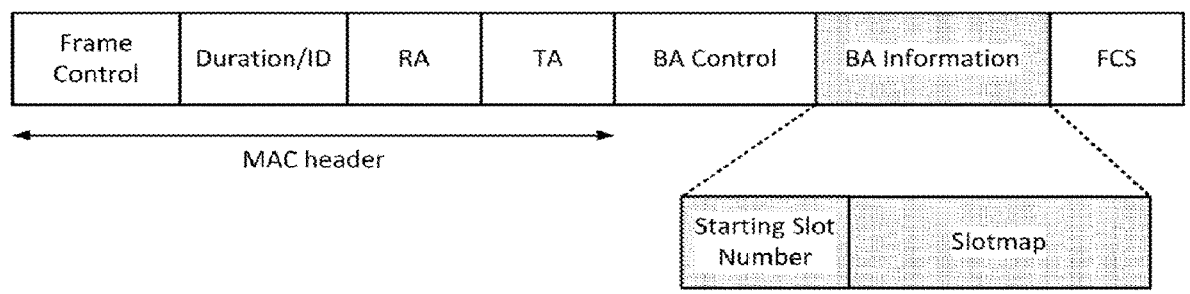
FIGS. 11 to 14 illustrate various embodiments of a block acknowledgement for a plurality of terminals according to the present invention.

FIG. 11 illustrates a frame structure of a block acknowledgement BA' according to an embodiment of the present invention. Referring to FIG. 11, the BA' has a frame format of a Multi-TID BA and includes acknowledgement information for a plurality of terminals. In other words, a BA' frame includes a duration field, a receiver address (RA) field, a transmitter address (TA) field, a block acknowledgement control (BA Control) field and a block acknowledgement information (BA Information) field, and may represent information of block acknowledgement for the plurality of terminals (Multi-STA Block ACK) through at least one of the above fields. According to an embodiment, the BA' may indicate, through a separate identifier, that the corresponding frame is a Multi-STA BA. In addition, according to an embodiment of the present invention, the acknowledgement information for the plurality of terminals may be represented through the BA information field. The BA information field may include identifier information or partial identifier information for reception target terminals of the BA'. At this point, a MAC address, an AID or the like of the corresponding terminal may be used as the identifier of the terminal and the partial identifier represents a part of the identifier.

According to a more detailed embodiment, the block acknowledgement information field may include a Starting Slot Number field and a Slotmap field. First, the Starting Slot Number field may indicate a smallest slot number in which data is normally received. Referring to the embodiment of FIG. 9, since data is normally received in slots Slot 2, Slot 4 and Slot 5, the Starting Slot number field indicates the number of Slot 2, namely, 010 that is the smallest number among these slots. Next, each bit of the Slotmap field may indicate a data reception state of each slot subsequent to the starting slot. At this point, a bit value 1 indicates a normal reception state, and a bit value 0 indicates a state where data is not received. Referring to the embodiment of FIG. 9, since data is normally received in Slot 2, Slot 4, and Slot 5 and data is not received in Slot 3, the Slotmap field represents 1011. On the other hand, the Starting Slot number field and the Slotmap field illustrated in FIG. 11 indicate an embodiment of a method for configuring the BA information field, but the present invention is not limited thereto. For example, the BA information field may represent, instead of the foregoing information on the slots, an identifier of each terminal in which data transmission is normally performed. At this point, the identifier information of each terminal may be represented in a bitmap format.

According to an additional embodiment of the present invention, a receiver address (RA) of the BA' frame may be set as an address designated for the Multi-STA Block ACK. For example, the receiver address (RA) may be set as a multicast address targeting a plurality of terminals in the BSS. At this point, the first bit of the multicast address may be set to 1.

Figure 12:
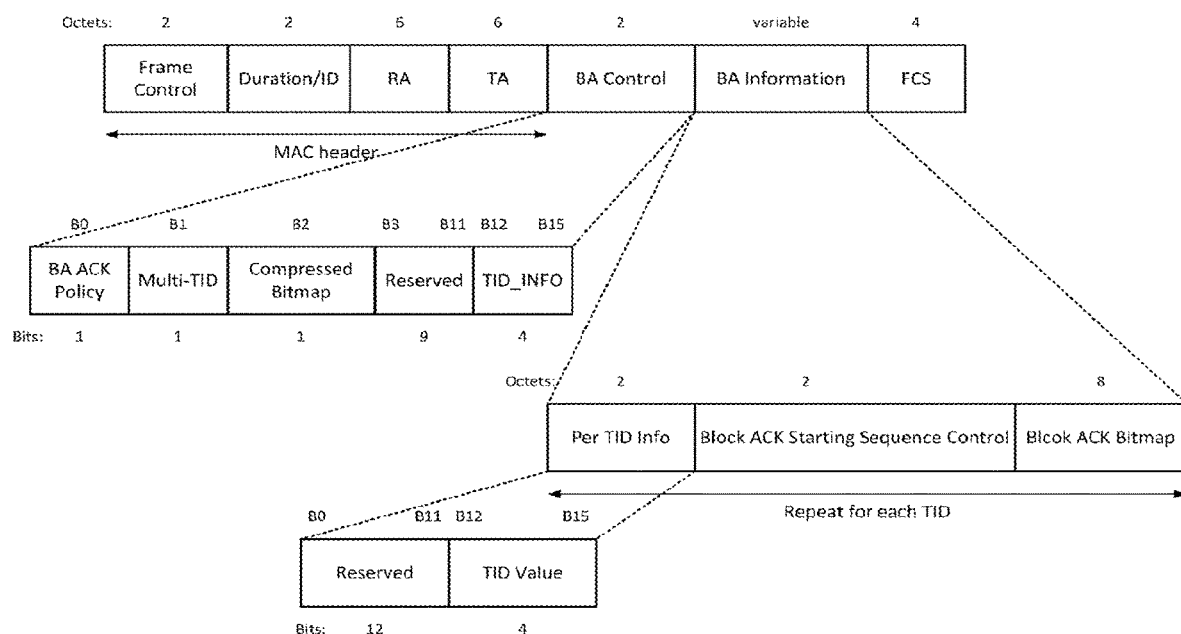
Figure 13:
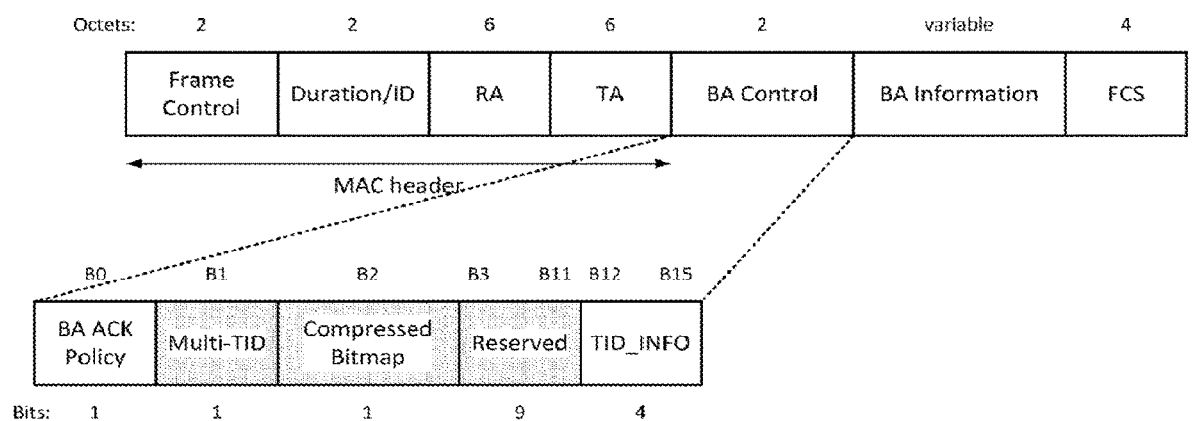
Figure 14:
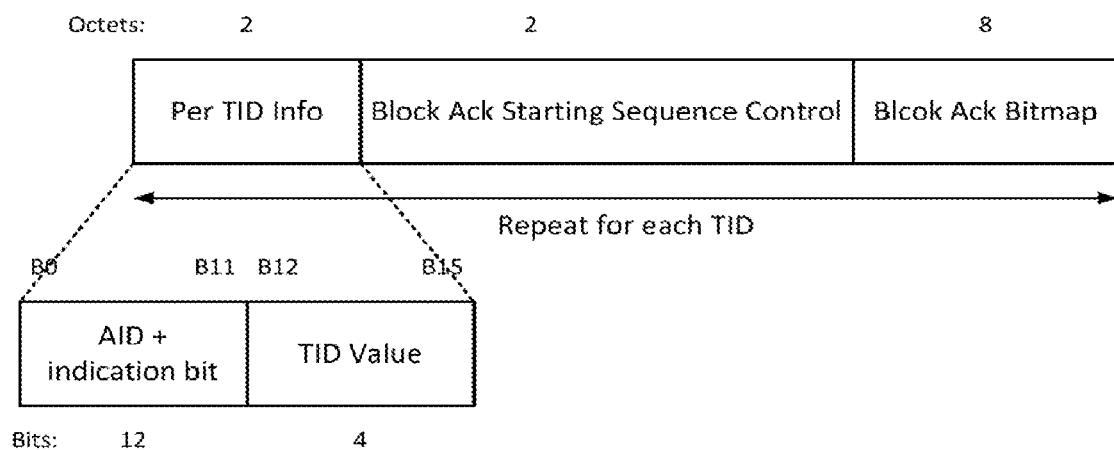

FIGS. 12 to 14 illustrate more detailed embodiments of a BA' frame structure. First, referring to FIG. 12, the BA' includes a block acknowledgement control (BA Control) field and a block acknowledgement information (BA information) field and may represent block acknowledgement information for a plurality of terminals through at least one of the fields. The BA information field is set to have a variable length and may include a Per TID information field, a Block ACK Starting Sequence Control field, and a Block ACK Bitmap field. The Per TID information field includes a Reserved bit field B0 to B11 and a TID Value field B12 to B15.

According to an embodiment of the present invention, acknowledgement information for the plurality of terminals may be represented by using the Reserved bit field of the Per TID information hit field. In more detail, the Reserved bit field includes AID information of a reception target terminal of the BA' and flag information for indicating Multi-STA BA. For example, the Reserved bit field may be composed of 12 bits B0 to B11. Among these, a specific bit, for example B11, may indicate whether the corresponding frame is the Multi-STA BA frame according to the embodiment of the present invention or a typical ACK frame. In addition, remaining bits of the Reserved bit field, for example, 11 bits of B0 to B11 may represent AID information of the reception target terminal of the corresponding frame BA'.

The BA information field having the above-described configuration may be repeated for each Traffic ID (TID). Since the BA information field has a variable length, AIDs for all terminals participating in multi-user uplink transmission may be inserted into the BA information field through the Reserved hit field. On the other hand, when flag information B11 of the Reserved bit field indicates a typical ACK frame, the BA Starting Sequence Control field and the BA Bitmap field may be omitted from the BA information field.

Next, according to an embodiment of FIG. 13, information for indicating Multi-STA BA may be included in the BA Control field. In more detail, the BA Control field includes a Multi-TID field B 1, a Compressed Bitmap field B2 and a Reserved bit field B3 to B11, and may indicate whether the corresponding frame is Multi-STA BA through at least one of the fields. For example, a specific bit among the Reserved bit field B3 to B11 may be used as a bit for indicating the Multi-STA BA. According to another embodiment, the BA Control field may indicate the Multi-STA BA with a combination of the Multi-TIM field B1 and the Compressed Bitmap field B2. Typically, since the Compressed Bitmap field B2 is not activated either when the Multi-TIM field B1 is not activated, the Multi-STA BA may be indicated using an exceptional combination in which B1 is assigned to 0 and B2 is assigned to 1.

FIG. 14 illustrates an additional embodiment using the BA information field of FIG. 12. As described above, the Reserved bit field B0 to B11 of the Per TID information field may include AID information on a reception target terminal of the BA' and information indicating the Multi-STA BA. When the channel condition is good, since most of data transmissions are normally performed, it is highly possible that data of all terminals participating in the multi-user uplink transmission is successfully transmitted. At this point, the Reserved bit field of the Per TID information field may represent respective AIDs for all participating terminals. But alternatively, the Reserved hit field may represent positive ACK for all the terminals (All ACK) at once. According to an embodiment of the present invention, a preset value (for example, B0 to B10: 11111111111) other than the values between 1 and 2007 allocated to the AID may be used as information for indicating the positive ACK for all the terminals (All ACK). Similarly, other than the values allocated to the AID, another preset value (for example, B0 to B10: 00000000000) may be used as information indicating negative ACK for all the terminals (All NACK). When the Reserved bit field of the Per TID information field is set as the ALL ACK or ALL NACK, a field for indicating the AID of an individual terminal may be omitted.

Figure 15:
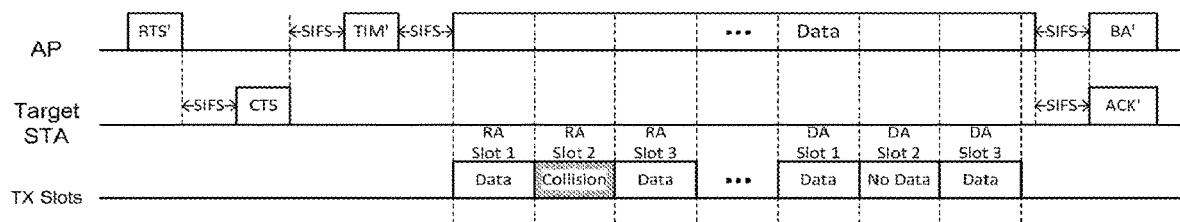
FIGS. 15 and 16 illustrate other embodiments in which a plurality of terminals simultaneously transmit data.
Figure 16:
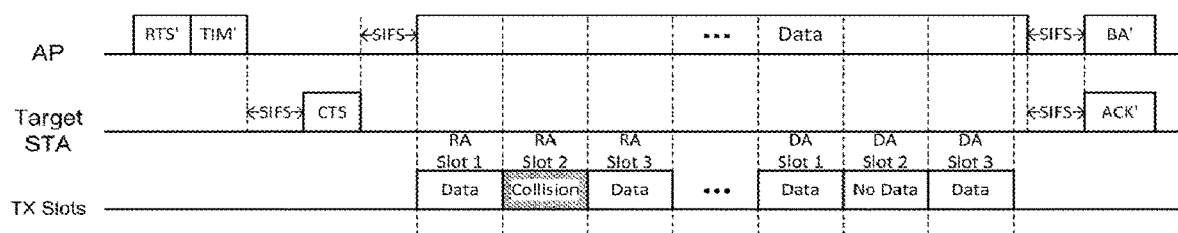

FIGS. 15 and 16 illustrate other embodiments in which a plurality of terminals simultaneously transmit data. According to the embodiments of FIGS. 15 and 16, an uplink data transmission period of a plurality of terminals may include at least one of a dedicated Access (DA) period and a random Access (RA) period. To this end, according to an embodiment of the present invention, a modified Traffic Indicator Map (TIM) may be used as a trigger frame for indicating simultaneous uplink data transmission of multi-users. At this point, as illustrated in FIG. 15, the modified TIM (hereinafter, TIM') may be transmitted SIFS time after the AP has received the CTS, or alternatively, as illustrated in FIG. 16, right after the AP has transmitted RTS'. However, the method of transmitting TIM' in the present invention is not limited to those illustrated in FIGS. 15 and 16.

According to an embodiment of the present invention, the trigger frame may indicate at least one of a DA period and an RA period. The DA period consists of at least one DA slot, and similarly, the RA period consists of at least one RA slot. In the DA slot, a terminal designated to the corresponding slot transmits uplink data. Furthermore, in the RA slot, a plurality of terminals in the BSS contend to transmit uplink data without a separately designated terminal. At this point, information about the terminal designated to the DA slot may be indicated by the trigger frame. When one terminal is designated to one DA slot, non-contention based uplink data transmission may be performed. The AP may indicate at least one of the DA period and RA period through a trigger frame to determine an uplink data transmission scheme for the plurality of terminals. According to an embodiment of the present invention, the trigger frame may represent AID information for each terminal allocated to the DA period. When the trigger frame indicates the RA period, a preset value (for example, AID=0) other than the values between 1 and 2007 allocated to the AID of a terminal may be designated as a value of an AID field included in the trigger frame.

In an embodiment of the present invention, the DA period and the RA period may be classified into different transmission times or different channel groups. Similarly, the DA slot and the RA slot respectively constituting the DA period and the RA period may also be classified by a time unit or by a channel (or subchannel) unit. At this point, the DA/RA period and the DA/RA slot constituting the corresponding period may be set to an identical domain, or alternatively set to different domains. For example, when the DA slot and the RA slot are respectively allocated to specific channels (or subchannels), the DA period may be set to a channel group including at least one DA slot (i.e., a DA channel) and the RA period may be set to a channel group including at least one RA slot (i.e., an RA channel) (identical domain). However, according to another embodiment, the DA period and the RA period may be set to different transmission times. In this case, DA slots and RA slots within each DA period and RA period in a time domain may be allocated by a channel (or subchannel) unit (different domains).

The numbers of the DA slots and the RA slots may be set to fixed values, or alternatively set to variable values. When the numbers of the DA slots and the RA slots are set to variable values, the AP may transmit, through the trigger frame, at least one of information about the number of DA slots and information about the number of RA slots. When the total number of transmission slots (TX slots) including the DA slots and the RA slots is fixed, the AP may transmit, through the trigger frame, only one of the information about the number of DA slots and information about the number of RA slots. When the trigger frame only includes the information about the number of DA slots, the number of RA slots may be determined as a value obtained by subtracting the number of DA slots from the total number of transmission slots. When the DA slots and the RA slots are allocated by a channel unit, channels pre-designated among the total transmission channels (TX Slot) may be allocated to the DA channels and RA channels, respectively. According to another embodiment, the AP may determine channels to be allocated to the DA channel and RA channel, and transmit such channel allocation information through the trigger frame.

According to an embodiment, when the DA period and the RA period are classified into different transmission times, the DA period may be disposed after the RA period. Thus, in consideration of data round trip times and processing delays, etc., of target terminals to be allocated to each DA slot, each target terminal may secure a time to prepare uplink data transmission through a designated DA slot. However, the disposition of the DA period and the RA period is not limited thereto.

When the DA period is established, the AP may determine terminals to be allocated to each DA slot of the DA period and transmit each DA slot allocation information through the trigger frame. The AP may determine a terminal to be allocated to the DA slot according to various embodiments. According to an embodiment, in order to guarantee accesses of terminals expected to transmit an uplink TCP ACK, the AP may allocate the DA slots to the corresponding terminals. The transmission possibility of TCP ACK may be obtained through TCP information of messages exchanged between the AP and the terminals in the BSS. Among TCP sessions delivered through the AP, for a session in which a TCP FIN packet is not transmitted after a TCP SYN packet has been transmitted, the probability that a terminal will transmit a TCP ACK packet is high. Accordingly, the AP may set a terminal of a session satisfying the above condition as a candidate terminal to be allocated to the DA slot. According to an additional embodiment, the AP decodes each TCP packet, and when a terminal having received data and then not having transmitted an ACK is identified, the AP may set the corresponding terminal as a candidate terminal to be allocated to the DA slot. When the number of candidate terminals is equal to or smaller than the predetermined number of DA slots, the AP allocates respective candidate terminals to predetermined DA slots. However, when the number of candidate terminals exceeds the predetermined number of DA slots, the AP selects a part of the candidate terminals to allocate the selected candidate terminals to the predetermined DA slots.

In the DA period, terminals designated by the trigger frame transmit uplink data. At this point, the DA slots (DA slots 1, 2 and 3) through which respective terminals will transmit the uplink data may be designated by the trigger frame. Each terminal in the BSS obtains DA slot allocation information in the trigger frame and transmits the uplink data through the allocated DA slot, when the corresponding terminal is allocated to a specific DA slot. The AP receives, through each DA slot (DA slots 1, 2, and 3), the uplink data of at least one terminal designated by the trigger frame in the DA period. On the other hand, in the RA period, at least one terminal having uplink data to be transmitted transmits the uplink data through the RA slots (RA slots 1, 2, and 3) allocated to the RA period. At this point, the RA slot to be used by each terminal may be determined by the individual terminal. According to an embodiment, each terminal may determine the RA slot to be used by the corresponding terminal based on RA slot information allocated to the RA period and an identifier of the corresponding terminal, etc. When both the DA period and the RA period are used, terminals not allocated to the DA slots may randomly transmit the uplink data in the RA period. In other words, among terminals having uplink data to be transmitted, terminals not allocated with DA slots may randomly select RA slots to transmit the uplink data in the RA period. When an uplink data transmission period including the DA period and RA period is terminated, the AP transmits a block ACK (BA') for a plurality of terminals having transmitted uplink data through each DA slot and RA slot.

FIG. 17 illustrates an embodiment of a trigger frame that triggers simultaneous data transmission of a plurality of terminals. As described above in the embodiments of FIGS. 15 and 16, a modified TIM (TIM') may be used as the trigger frame for indicating simultaneous uplink data transmission of multi-users.

Referring to FIG. 17, the TIM' may have an Element ID field value modified from a TIM frame of legacy 802.11 and include a Slot Count field of 1 byte instead of a DTIM Period field and a DTIM Count field. The Element ID field value of the TIM' may be allocated to one of values remaining in a reserved state among the Element ID list of a legacy 802.11 management frame. In addition, the Slot Count field represents the number of slots to be used for uplink data transmission. According to an embodiment, the Slot Count field may represent the number of DA slots allocated to the DA period. Next, a Bitmap Control field may represent a minimum AID value of terminals in the BSS, which are allocated to the DA slots. A Partial Virtual Bitmap field may represent whether to allocate the DA slot for each subsequent AID starting from the AID value of the Bitmap Control field. At this point, bit value 1 represents a DA slot allocation state and bit value 0 represents a DA slot non-allocation state. Accordingly, the number of is in the Partial Virtual Bitmap field may be set to be equal to a value of the Slot Count field. When TIM' indicates the RA period, the Bitmap Control field may represent a preset value (for example AID=0) other than values between 1 and 2007 allocated to an AID of a terminal.

Figure 18:
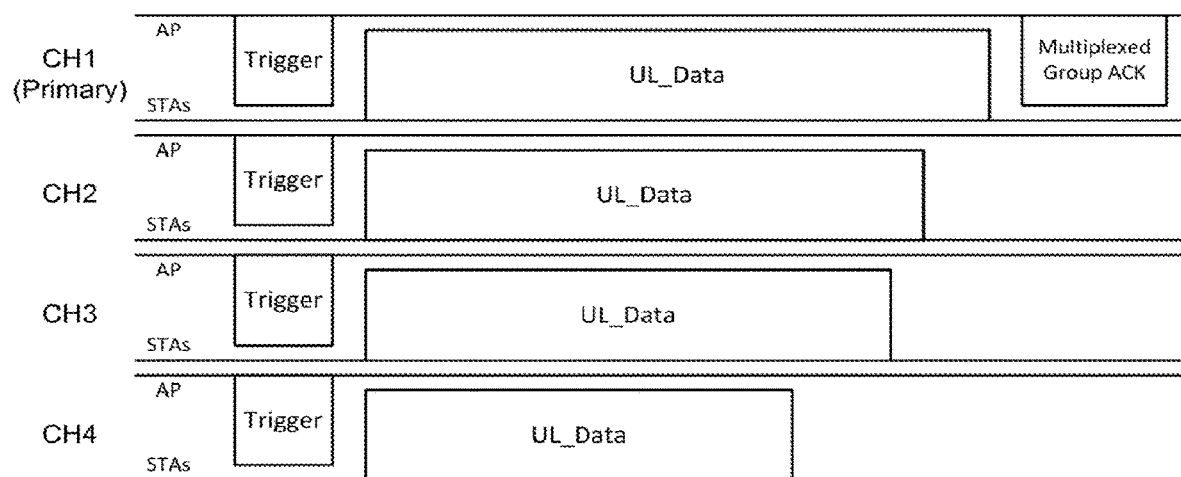
FIG. 18 illustrates a simultaneous uplink data transmission process by a plurality of terminals and a block acknowledgement transmission process by an AP according to another embodiment of the present invention.

FIG. 18 illustrates a simultaneous uplink data transmission process by a plurality of terminals and a block ACK transmission process by an AP according to another embodiment of the present invention.

The process of uplink data transmission of multi-users may be managed by the AP, which operates the BSS. In order to prevent a collision of resource allocation and data transmission, the AP may obtain information such as the presence of uplink data in a buffer and Transmission Opportunities (TXOP) of each terminal in the BSS, before the simultaneous uplink data transmission is started. In addition, the AP is required to transmit uplink data transmission timing information to each terminal. To this end, the multi-user uplink data transmission includes a trigger process and a scheduling process. A trigger of the multi-user uplink data transmission may be performed by trigger frame transmission of the AP according to the above-described embodiment. In addition, as described above, the scheduling may include an allocation of the DA period and/or the RA period, an allocation of individual slots in each period, and an allocation of a terminal for each DA slot, etc. According to an embodiment, the AP may perform the trigger after collecting information for scheduling of the multi-user uplink data transmission in advance. Alternatively, the AP may perform the trigger first and then collect the scheduling information thereafter.

According to an embodiment of the present invention, the trigger process and the scheduling process may include a process in which the AP and the terminals in the BSS exchange channel information available for the data transmission. For example, the AP may define available channels and transmit information thereon to each terminal. The terminals may feedback information on channels available to the corresponding terminal among the available channels defined by the AP. The AP may perform the scheduling process for the multi-user uplink data transmission based on the feedback information of each terminal.

The trigger process may include a NAV setting for a multi-user uplink data transmission period. As described in the aforementioned embodiment, when the trigger frame is a frame (for example, RTS') conforming to a legacy format, legacy terminals may set a NAV based on a duration field value included in a MAC header of the trigger frame. On the other hand, since the trigger frame is transmitted only by the AP, terminals distant from the AP may have difficulty in setting the NAV based on the trigger frame. Thus, according to an embodiment of the present invention, the AP may transmit the trigger frame with a power greater than that of a typical frame to prevent a hidden node problem.

When the trigger frame is transmitted, each terminal performs uplink data transmission at a transmission time indicated by the trigger frame. At this point, each terminal transmits the uplink data through a channel designated by the AP or through a channel randomly selected in a channel group allocated by the AP. When the uplink data transmissions of all the terminals are completed, the AP transmits a block acknowledgement for the plurality of terminals having transmitted the uplink data. On the other hand, in the multi-user uplink data transmission, an air time of each channel may be different due to various factors. Typically, such an air time of each channel may appear to be longer for a primary channel CH1 than for subchannels CH2 to CH4 as illustrated in FIG. 18.

Thus, according to an additional embodiment of the present invention, when the air times for each of the channels are different from each other, the AP may multiplex block acknowledgements for all the channels having been used for the multi-user uplink data transmission and transmit the multiplexed block acknowledgment through the primary channel CH1. When such a multiplexed group acknowledgment (Multiplexed Group ACK) is used, the subchannels CH2 to CH4 may be used by other terminals (for example, other terminals of an OBSS) right after a time when the air time of the uplink data transmission is over. Accordingly, the spectrum efficiency of the entire network may be improved.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication method of a wireless communication terminal, the method comprising:
receiving, from an access point, a trigger frame indicating uplink transmission of one or more users, wherein the trigger frame allocates at least one of a dedicated access slot or a random access slot; and
performing uplink transmission to the access point in response to the trigger frame,
wherein when the trigger frame allocates at least one random access slot, an association identifier (AID) field corresponding to the at least one random access slot is set to a preset value other than values of a predetermined range for AID assignment of each terminal.

2. The wireless communication method of claim 1, wherein the values of the predetermined range are values in a range of 1 to 2007.

3. The wireless communication method of claim 1, wherein when the trigger frame allocates the at least one random access slot, the uplink transmission is performed through a particular random access slot selected by the terminal among the at least one random access slot.

4. The wireless communication method of claim 1, wherein the performing uplink transmission further comprises:
performing the uplink transmission through the dedicated access slot without a contention when the terminal is designated to the dedicated access slot, and
performing the uplink transmission through the at least one random access slot with the contention when the terminal is not designated to the dedicated access slot.

5. The wireless communication method of claim 1, wherein when the trigger frame allocates at least one dedicated access slot and the at least one random access slot, a dedicated access slot group consisting of the at least one dedicated access slot and a random access slot group consisting of the at least one random access slot are classified into different channel or subchannel groups.

6. The wireless communication method of claim 5, wherein at least one of information on the number of the at least one dedicated access slot and information on the number of the at least one random access slot are indicated by the trigger frame.

7. The wireless communication method of claim 1, wherein the uplink transmission is performed at a predetermined time in response to the reception of the trigger frame.

8. A wireless communication terminal comprising:
a transceiver; and
a processor,
wherein the processor is configured to:
receive, from an access point, a trigger frame indicating uplink transmission of one or more users, wherein the trigger frame allocates at least one of a dedicated access slot or a random access slot, and
perform uplink transmission to the access point in response to the trigger frame,
wherein when the trigger frame allocates at least one random access slot, an association identifier (AID) field corresponding to the at least one random access slot is set to a preset value other than values of a predetermined range for AID assignment of each terminal.

9. The wireless communication terminal of claim 8, wherein the values of the predetermined range are values in a range of 1 to 2007.

10. The wireless communication terminal of claim 8, wherein when the trigger frame allocates of the at least one random access slot, the uplink transmission is performed through a particular random access slot selected by the terminal among the at least one random access slot.

11. The wireless communication terminal of claim 8,
wherein the processor performs the uplink transmission through the dedicated access slot without a contention when the terminal is designated to the dedicated access slot, and
wherein the processor performs the uplink transmission through the at least one random access slot with the contention when the terminal is not designated to the dedicated access slot.

12. The wireless communication terminal of claim 8, wherein when the trigger frame allocates at least one dedicated access slot and the at least one random access slot, a dedicated access slot group consisting of the at least one dedicated access slot and a random access slot group consisting of the at least one random access slot are classified into different channel or subchannel groups.

13. The wireless communication terminal of claim 12, wherein at least one of information on the number of the at least one dedicated access slot and information on the number of the at least one random access slot are indicated by the trigger frame.

14. The wireless communication terminal of claim 8, wherein the processor performs the uplink transmission at a predetermined time in response to the reception of the trigger frame.

* * * * *